(12) United States Patent
Namkung et al.

(10) Patent No.: US 9,886,112 B2
(45) Date of Patent: Feb. 6, 2018

(54) PRESSING PAD FOR ASSEMBLING DISPLAY MODULE

(71) Applicant: SAMSUNG DISPLAY CO., LTD., Yongin, Gyeonggi-Do (KR)

(72) Inventors: Jun Namkung, Asan-si (KR); Yonghoon Won, Anyang-si (KR); Yonghoon Chun, Cheonan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 195 days.

(21) Appl. No.: 14/819,042

(22) Filed: Aug. 5, 2015

(65) Prior Publication Data

US 2016/0085330 A1    Mar. 24, 2016

(30) Foreign Application Priority Data

Sep. 19, 2014 (KR) .......................... 10-2014-0124848

(51) Int. Cl.
*B23P 19/00* (2006.01)
*H05K 13/04* (2006.01)
*G06F 3/041* (2006.01)
*G06F 1/16* (2006.01)

(52) U.S. Cl.
CPC ............ *G06F 3/041* (2013.01); *G06F 1/1626* (2013.01); *G06F 1/1637* (2013.01); *G06F 1/1643* (2013.01); *G06F 1/1652* (2013.01); *G06F 2203/04102* (2013.01); *G06F 2203/04103* (2013.01); *Y10T 29/5313* (2015.01)

(58) Field of Classification Search
CPC ......... Y10T 29/49826; Y10T 29/49002; Y10T 29/5313; Y10T 29/53961; Y10T 29/53161; G02F 2001/133354; B32B 2457/202; H05K 2201/10128

USPC ...... 29/729, 428, 505, 592.1, 738, 753, 757, 29/761

See application file for complete search history.

(56) References Cited

U.S. PATENT DOCUMENTS

| 7,897,527 B2 * | 3/2011 | Yoshida | ................ B30B 15/061 442/224 |
| 8,736,162 B2 * | 5/2014 | Jin | ........................... G09F 9/33 313/483 |

FOREIGN PATENT DOCUMENTS

| JP | 2000-286538 A | 10/2000 |
| JP | 2001-229812 A | 8/2001 |
| JP | 2007-035546 A | 2/2007 |
| KR | 10-2007-0038211 A | 4/2007 |
| KR | 10-2010-0075150 A | 7/2010 |
| KR | 10-2016-0044162 A | 4/2016 |

* cited by examiner

*Primary Examiner* — Thiem Phan
(74) *Attorney, Agent, or Firm* — Lee & Morse, P.C.

(57) ABSTRACT

A pressing pad for assembling a display module by applying a pressure to a flexible display panel to attach the flexible display panel to a window member and a method of assembling a display module, the pressing pad including a first pressing part that applies a first pressure onto a display area of the flexible display panel; a second pressing part that applies a second pressure onto a pad area of the flexible display panel, the second pressure being less than the first pressure and the pad area of the flexible display panel being adjacent to the display area of the flexible display panel; and a support part that supports the first and second pressing parts, wherein the second pressing part has a height from the support part that is less than a height of the first pressing part.

13 Claims, 16 Drawing Sheets

PRESSING PAD FOR ASSEMBLING DISPLAY MODULE

CROSS-REFERENCE TO RELATED APPLICATION

Korean Patent Application No. 10-2014-0124848, filed on Sep. 19, 2014, in the Korean Intellectual Property Office, and entitled: "Pressing Pad For Assembling Display Module and Method Of Assembling Display Module," is incorporated by reference herein in its entirety.

BACKGROUND

1. Field

Embodiments relate to a pressing pad for assembling a display module and a method of assembling the display module.

2. Description of the Related Art

Flexible display devices used in mobile phones are now being developed. Such a flexible device may include an active area (or a display area) on which an image is displayed and an inactive area (or a pad area) on which the image is not displayed. In order to assemble the display module, a process of attaching a window member to a flexible substrate by applying a pressure may be performed.

SUMMARY

Embodiments are directed to a pressing pad for assembling a display module and a method of assembling the display module.

The embodiments may be realized by providing a pressing pad for assembling a display module by applying a pressure to a flexible display panel to attach the flexible display panel to a window member, the pressing pad including a first pressing part that applies a first pressure onto a display area of the flexible display panel; a second pressing part that applies a second pressure onto a pad area of the flexible display panel, the second pressure being less than the first pressure and the pad area of the flexible display panel being adjacent to the display area of the flexible display panel; and a support part that supports the first and second pressing parts, wherein the second pressing part has a height from the support part that is less than a height of the first pressing part.

The window member may include a first portion having a front surface that is defined by first and second directions that are perpendicular to each other; a second portion extending from the first portion in the second direction with respect to a first boundary line that extends in the first direction, the second portion being bent toward the flexible display panel; and a third portion extending from the first portion in the second direction with respect to a second boundary line that is parallel to the first boundary line, the third portion being bent toward the flexible display panel.

The flexible display panel may include a main display part attached to the first portion of the window member; a first side display part attached to the second portion of the window member; and a second side display part attached to the third portion of the window member.

A pressing surface of the first pressing part may have a convex curved shape when viewed in cross-section in a plane defined by the second direction and a third direction perpendicular to the second direction.

The pressing surface of the first pressing part may have a straight linear shape that is substantially parallel to the main display part of the flexible display panel when viewed in cross-section of the first pressing part in a plane defined by the first direction and the third direction.

The first and second pressing parts may be spaced apart from each other in the first direction.

The second pressing part may have a height that gradually decreases moving away from the first pressing part in the first direction.

The height of the second pressing part may be about 50 μm to about 1 mm less than the height of the first pressing part.

The pressing surface of the first pressing part may have a convex curved shape when viewed in cross-section in a plane defined by the first direction and the third direction.

When viewed in cross-section in a plane defined by the second direction and a third direction perpendicular to the second direction, the pressing surface of the first pressing part may have a straight line part corresponding to the first portion of the window member; a first curved part corresponding to the second portion of the window member; and a second curved part corresponding to the third portion of the window member.

The pressing surface of the first pressing part may have a straight line shape that is substantially parallel to the main display part of the flexible display panel when viewed in cross-section in a plane defined by the first direction and the third direction.

Each of the first and second pressing parts may include silicon.

The flexible display panel may include a display panel part, a touch panel part, and a polarization part.

The embodiments may be realized by providing a method of assembling a display module, the method including aligning a flexible display panel on a pressing pad for assembling the display module with a window member, the flexible display panel including a display area and a pad area and the window member including a first portion having a front surface defined by first and second directions that are perpendicular to each other; a second portion extending in the second direction with respect to a first boundary line extending in the first direction, the second portion being bent toward the flexible display panel; and a third portion extending in the second direction with respect to a second boundary that is in parallel to the first boundary line, the third portion being bent toward the flexible display panel; and applying a first pressure by pressing the pressing pad onto the display area of the flexible display panel to attach the flexible display panel to the window member, wherein aligning the flexible display panel with the window member includes aligning a central point of the flexible display panel with a central point of the first portion of the window member.

The pressing pad may include a first pressing part that applies the first pressure onto the display area of the flexible display panel; and a support part that supports the first pressing part.

The method may further include applying a second pressure onto the pad area of the flexible display panel such that the second pressure is less than the first pressure.

The pressing pad may include a first pressing part that applies the first pressure onto the display area of the flexible display panel; a second pressing part that applies the second pressure onto the pad area of the flexible display panel; and a support part that supports the first and second pressing parts.

The first pressure may have a maximum value of about 0.1 MPa to about 1 MPa.

BRIEF DESCRIPTION OF THE DRAWINGS

Features will be apparent to those of skill in the art by describing in detail exemplary embodiments with reference to the attached drawings in which.

DETAILED DESCRIPTION

Figure 1A:
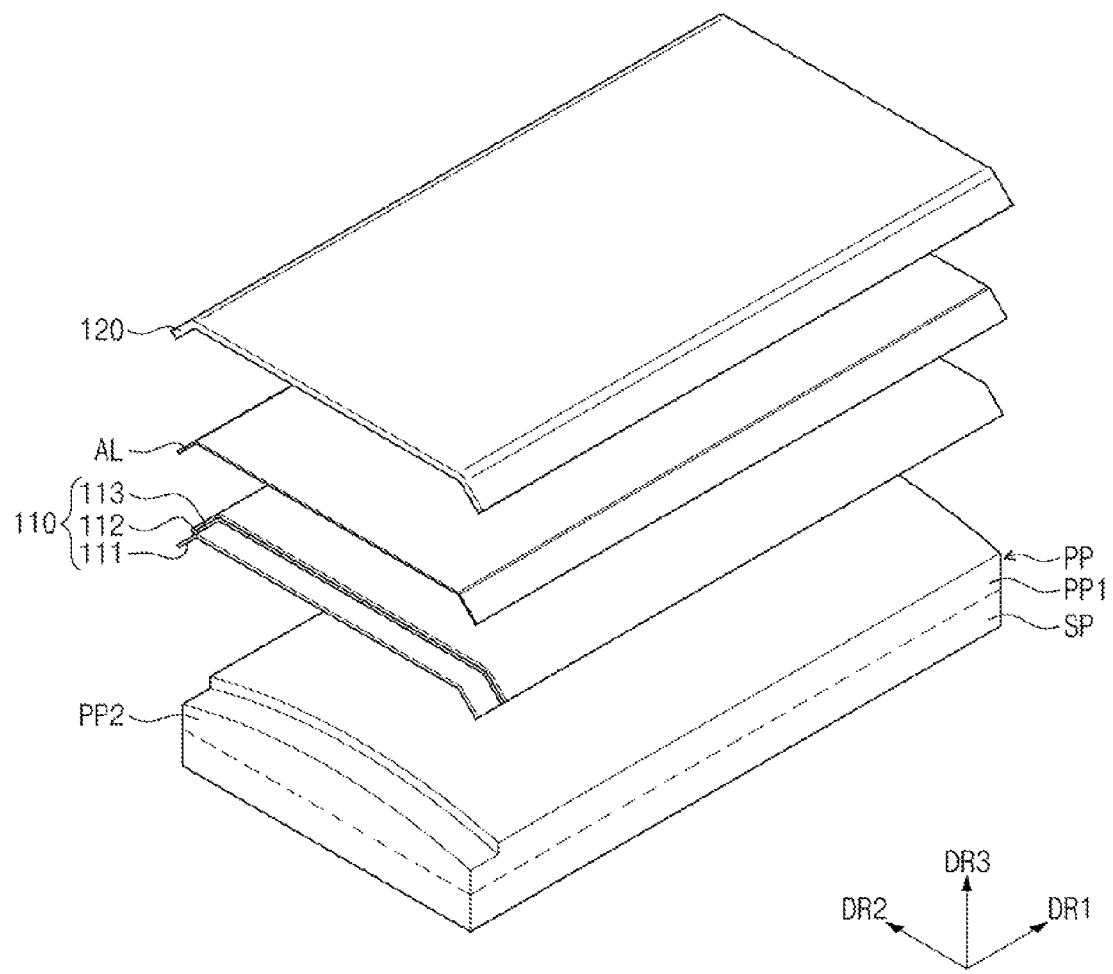
FIG. 1A illustrates an exploded perspective view of a display module and a pressing pad according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

The meaning of 'include' or 'comprise' specifies a property, a numeral, a step, an operation, an element or a combination thereof, but does not exclude other properties, numerals, steps, operations, elements or combinations thereof. In the specification, it will be understood that when a layer, a film, a region, or a plate is referred to as being 'on' another layer, film, region, or plate, it can be directly on the other layer, region, or plate, or intervening layers, films, regions, or plates may also be present. In the specification, it will be understood that when a layer, a film, a region, or a plate is referred to as being 'on' another layer, film, region, or plate, it can be directly on the other layer, region, or plate, or intervening layers, films, regions, or plates may also be present.

Figure 1B:
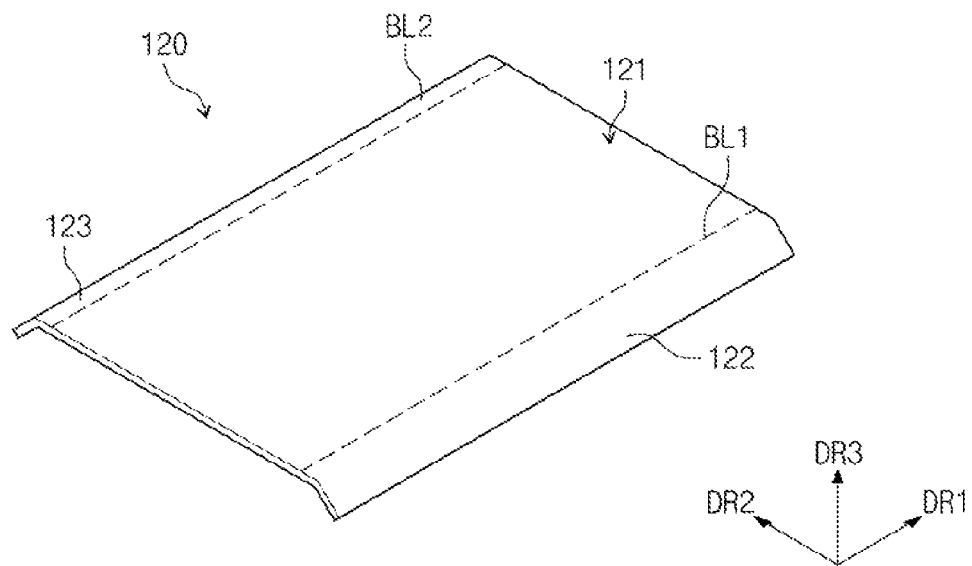
FIG. 1B illustrates a perspective view of a window member according to an embodiment.
Figure 1C:
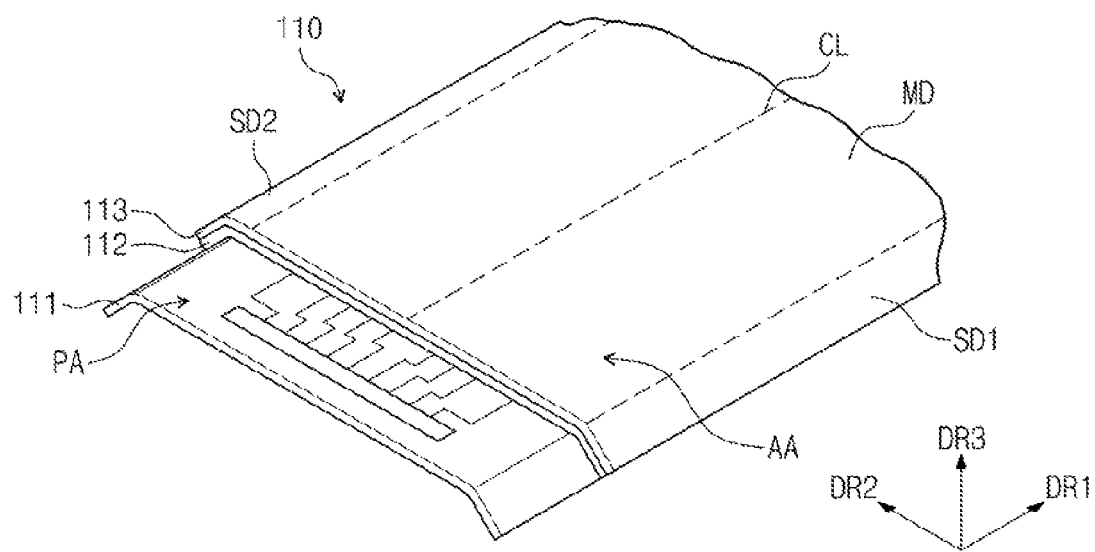
FIG. 1C illustrates a perspective view of a flexible display panel according to an embodiment.
Figure 2:
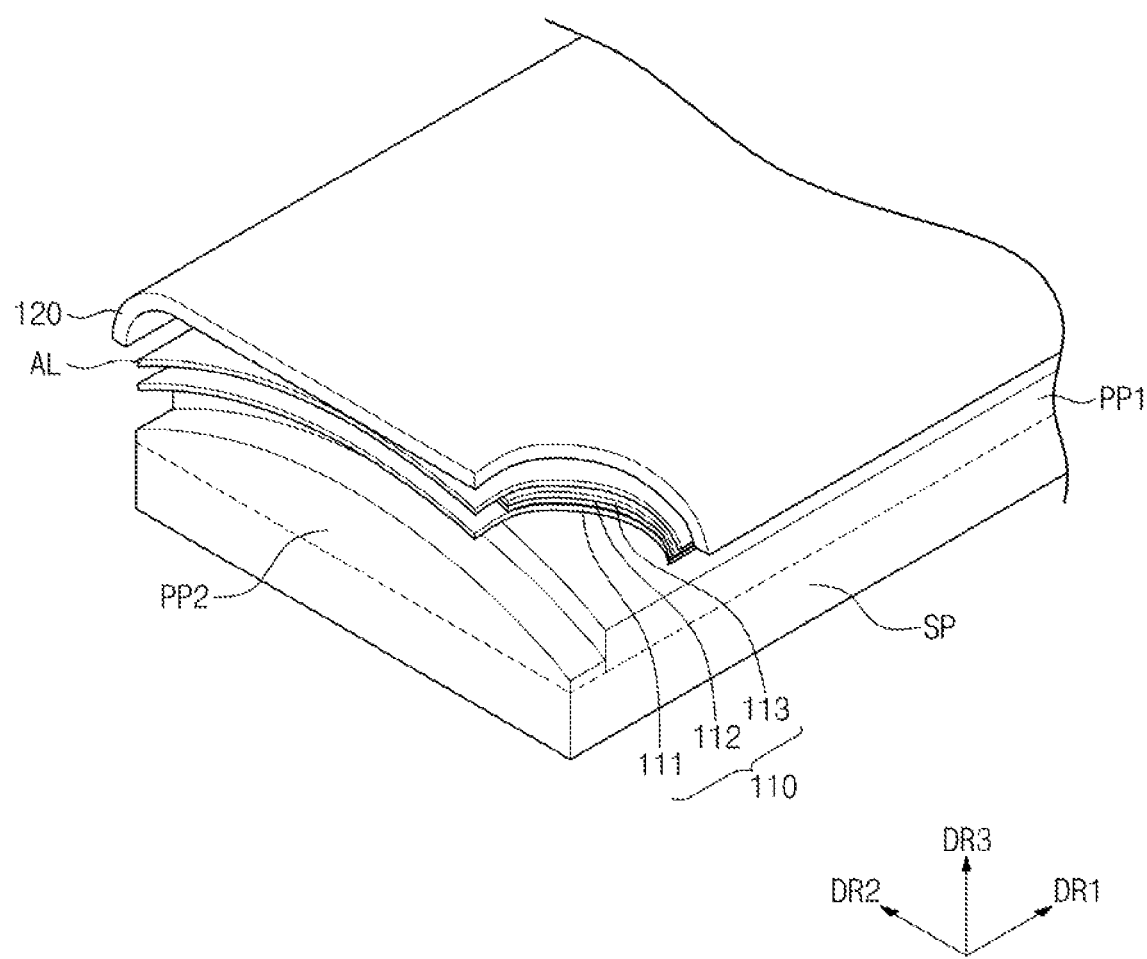
FIG. 2 illustrates a perspective view of the display module and the pressing pad according to an embodiment.

FIG. 1A illustrates an exploded perspective view of a display module 100 and a pressing pad PP according to an embodiment. FIG. 1B illustrates a view of a window member 120 of a display module 100 according to an embodiment. FIGS. 1C and 1D illustrate views of a flexible display panel 110 of the display module 100 according to an embodiment. FIG. 2 illustrates a perspective view of the display module 100 and the pressing pad PP according to an embodiment.

In FIGS. 1A to 1C and FIG. 2, the display module 100 (e.g., constituting a portion of a mobile phone) and the pressing pad PP (used to assemble the display module 100) are exemplarily illustrated. In an implementation, the display module 100 may be used in, e.g., televisions or large-scaled flexible display devices such as outdoor billboards, monitors for PCs, display devices for laptop computers, personal digital terminals, vehicle navigation units, game machines, portable electric devices, watch-type electric devices, or small and medium flexible display devices such as cameras. In an implementation, the display module 100 may be applied to other electric devices. In an implementation, the pressing pad PP may be changed in shape and size according to a shape and size of the display module 100.

As illustrated in FIGS. 1A to 1C and FIG. 2, the display module 100 may include a flexible display panel 110 and a window member 120. In an implementation, the display module 100 may include an adhesion member AL for coupling the flexible display panel 110 to the window member 120. The adhesion member AL may be provided in a state where the adhesion member AL adheres to one of the flexible display panel 110 and the window member 120 before an assembling process.

As illustrated in FIGS. 1A and 1B, the window member 120 may include a first portion 121, a second portion 122, and a third portion 123. The first portion 121 may have a front surface defined by a first direction DR1 and a second direction DR2, which are perpendicular to each other (e.g., the front surface may lie in a plane defined by the first direction DR1 and the second direction DR2). The second portion 122 may extend from the first portion 121 in the second direction DR2 with respect to or along a first boundary line BL1 (that extends in the first direction DR1). The second portion 122 may be bent toward the flexible display panel 110 in a third direction DR3 (e.g., orthogonal to the plane defined by the first direction DR1 and the second direction DR2). The third portion 123 may extend from the first portion 121 in the second direction DR2 with respect to or along a second boundary line BL2 (that is in parallel to the first boundary line BL1). The third portion 123 may be bent toward the flexible display panel 110 in the third direction DR3.

In an implementation, the first portion 121 may have a rectangular shape. In an implementation, a length thereof in the first direction DR1 may be greater than a length thereof in the second direction DR2.

In an implementation, the second portion 122 and the third portion 123 may have a same extending length (e.g., in the second direction DR2). In an implementation, the extending length of each of the second and third portions 122 and 123 may be less than the length of the first portion 121 in the second direction DR2.

The window member 120 may act as a mold for forming a shape of the flexible display panel 110 when the flexible display panel 110 is attached thereto. The flexible display panel 110 may be attached to the window member 120 along a shape of the window member 120 through a pressure applied by the pressing pad PP.

The window member 120 may cover a front surface of the flexible display panel 110 to protect flexible display panel 110. The window member 120 may be formed of glass or plastic.

As illustrated in FIGS. 1A and 1C, the flexible display panel 110 may include a display part 111, a polarization part 112, and a touch panel part 113. In an implementation, a portion of the parts may be removed, or another part may be further provided.

The flexible display panel 110 may include a main display part MD (attached to the first portion 121 of the window member 120), a first side display part SD1 (attached to the second portion 122 of the window member 120), and a second side display part SD2 (attached to the third portion 123 of the window member).

The flexible display panel 110 may be bendable or curvable and/or may be formed of a material having high restoring force. For example, the flexible display panel 110 may include one of polyimide, polyethylene terephthalate, polyethylene naphthalate (PEN), poly carbonate, and polyester sulfone (PES).

The flexible display panel 110 may be previously bent toward the window member 120 with respect to a central line CL (that extends in the first direction DR1) before the flexible display panel 110 is attached to the window member 120.

As illustrated in FIG. 1C, the display part 111 may include a display area AA and a pad area PA. The display area AA may be an area on which pixels are disposed to display an image. The pad area PA may be an area on which a gate pad part for connecting a gate drive IC to a gate line and a data pad part for connecting a data drive IC to a data line are disposed.

The polarization part 112 may be provided to help improve visibility by, e.g., reflecting external light on the display area AA. The polarization part 112 may include, e.g., a polarization film and a λ/4 plate. The λ/4 plate may help prevent the light incident from the outside from being reflected and emitted to the outside to help improve display quality. The polarization part 112 may cover at least the display area AA.

Methods for realizing the touch panel part 113 may include, e.g., resistive, photo-sensitive, and capacitive methods. A capacitive panel may detect a change in capacitance measured between a conductive detection pattern and the other surrounding detection pattern or a ground electrode when a user's hand or an object contacts to convert a contact position into an electrical signal. The touch panel part 113 may include a transparent base material formed of polyimide, sensing patterns on one surface of the transparent base material, and sensing lines connecting the sensing patterns to an external driving circuit.

The adhesion member AL may be between the window member 120 and the touch panel part 113 to adhere the window member 120 to the touch panel part 113. The adhesion member AL may be formed of an optically clear adhesive (OCA) film. In an implementation, the adhesion member AL may be replaced with or may include an adhesion layer that is formed by curing a coated liquid-phase adhesion material.

The pressing pad PP may press the flexible display panel 110 and the window member 120 to assemble the display module 100. The pressing pad PP may include a first pressing part PP1 (that applies a pressure to the display area AA of the flexible display panel 110), a second pressing part PP2 (that applies a pressure to the pad area PA), and a support part SP (that supports the first and second pressing parts PP1 and PP2). Hereinafter, a configuration of the pressing pad PP will be described in detail.

Figure 3A:
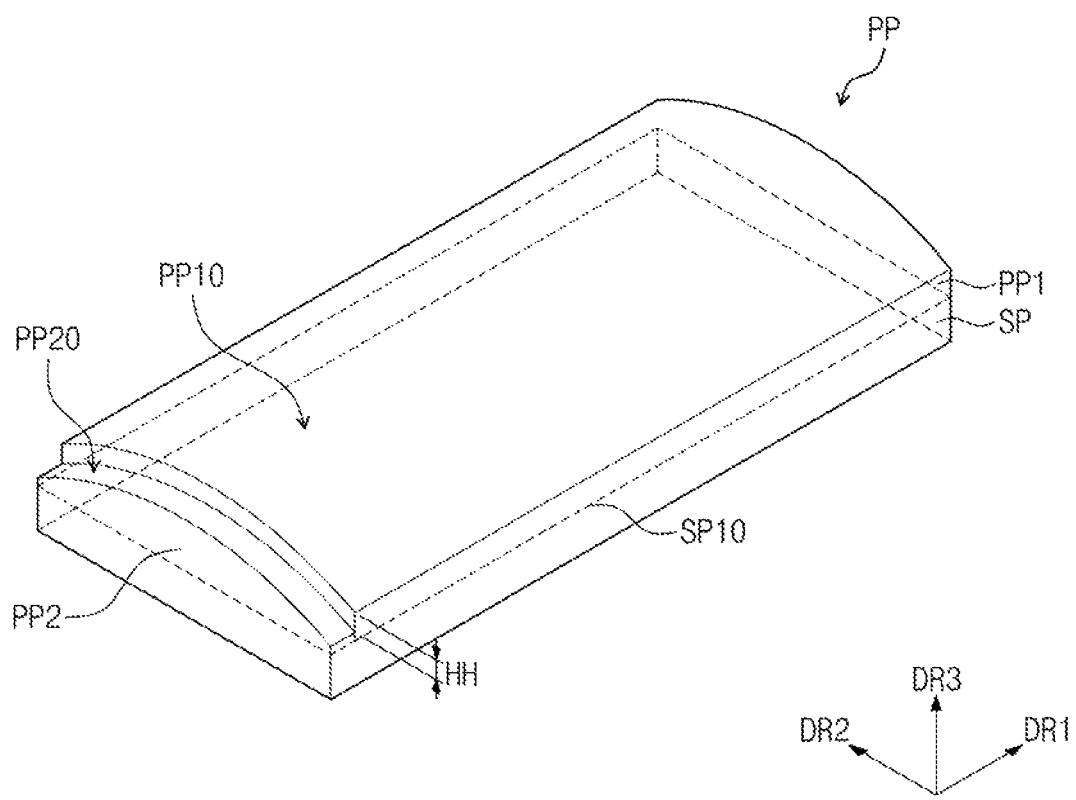
FIGS. 3A to 3C illustrate views of the pressing pad according to an embodiment.
Figure 3B:
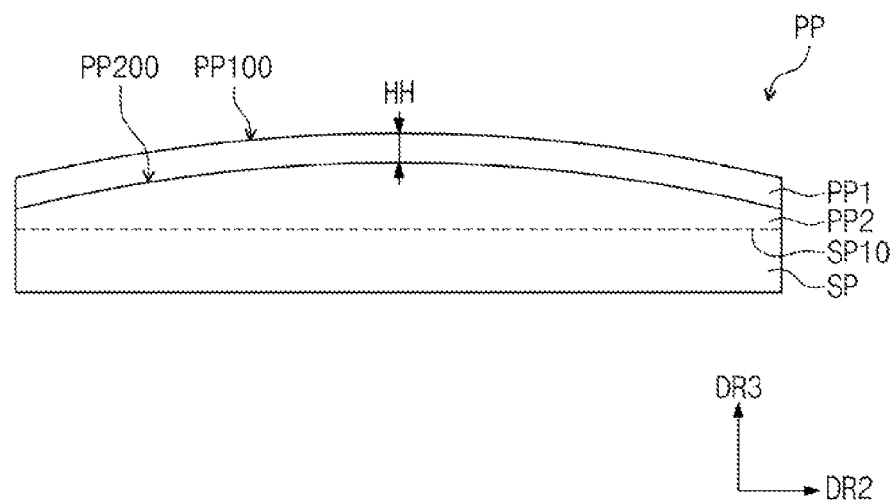
Figure 3C:

FIGS. 3A to 3C illustrate views of the pressing pad PP according to an embodiment. FIG. 3A illustrates a perspective view of the pressing pad PP according to an embodiment, and FIGS. 3B and 3C illustrate cross-sectional views of the pressing pad PP according to an embodiment. Hereinafter, a structure of the pressing pad PP will be described in more detail with reference to FIGS. 3A to 3C.

As illustrated in FIG. 3A, the pressing pad PP may include the first pressing part PP1, the second pressing part PP2, and the support part SP.

The support part SP may support the first and second pressing parts PP1 and PP2 in parallel on a support surface SP10. In an implementation, the support part SP may be integrated with the first and second pressing parts PP1 and PP2 to support the first and second pressing parts PP1 and PP2. In an implementation, the support part SP may be separated from the first and second pressing parts PP1 and PP2 with respect to the support surface SP10 to support the first and second pressing parts PP1 and PP2.

In the first pressing part PP1, a surface that directly contacts the flexible display panel 110 (to apply a first pressure) may be defined as a first pressing surface PP10, and a surface that directly contacts the flexible display panel 110 (to apply a second pressure) may be defined as a second pressing surface PP20.

The first pressing part PP1 may apply the first pressure to the display area AA of the flexible display panel 10. The second pressing part PP2 may apply the second pressure (e.g., that is less than the first pressure) to the pad area PA of the flexible display panel 110. The first pressure may be a pressure value measured at a spot where the flexible display panel 110 initially contacts the first pressing part PP1, and the second pressure may be a pressure value measured at a spot where the flexible display panel 110 initially contacts the second pressing part PP2. In an implementation, the second pressure may be zero, e.g., pressure may not be applied to the pad area PA by the second pressing part PP2 or the second pressing part PP2 may not contact the pad area PA.

As illustrated in FIG. 3B, the first pressing surface PP10 may include a first curve PP100 in a cross-sectional view of the first pressing surface PP10 that is cut in the second direction DR2, e.g., in a plane defined by the second direction DR2 and the third direction DR3. The first curve PP100 may be on an entirety of or only on a portion of the first pressing surface PP10. In an implementation, the first curve PP100 may have a curvature that is greater than or equal to that of the bent portion of the flexible display panel 110.

The second pressing surface PP20 may include a second curve PP200 in a cross-sectional view of the second pressing surface PP20 that is cut in the second direction DR2, e.g., in the plane defined by the second direction DR2 and the third direction DR3. In an implementation, the second curve PP100 may be on an entirety of or only on a portion of the second pressing surface PP20.

As illustrated in FIG. 3C, in one view, the first pressing surface PP10 may include a straight line substantially parallel to the main display part MD of the flexible display panel 110 in a cross-sectional view of the first pressing surface PP10 that is cut in the first direction DR1, e.g., in a plane defined by the first direction DR1 and the third direction DR3.

In an implementation, a cross-sectional view of the second pressing surface PP20 that is cut in the first direction DR1, e.g., in the plane defined by the first direction DR1 and the third direction DR3, may have the same shape as that of the first pressing surface PP1 that is cut in the plane defined by the first direction DR1 and the third direction DR3.

A difference between a height from the support surface SP10 to the first pressing part PP1 (in the third direction DR3) and a height from the support surface SP10 to the second pressing part PP2 (in the third direction DR3) is called a pressing part height difference HH. Maintaining the pressing part height difference HH at, e.g., about 1 mm or less, may help ensure that the second pressing part PP2 applies sufficient pressure to the pad area PA of the flexible display panel 110. When the pressing part height difference HH range from, e.g., about 50 µm to about 1 mm, the second pressure may be greater than zero and less than the first pressure. Maintaining the pressing part height difference HH at, e.g., about 50 µm or greater, may help ensure that there is a difference between the first pressure and the second pressure.

When a pressure is applied to the first and second pressing parts PP1 and PP2 while pressing, each of the first and second pressing parts PP1 and PP2 may be flexibly changed in shape. Each of the first and second pressing parts may include, e.g., silicon (e.g., silicone) or another flexible material.

Figure 4A:
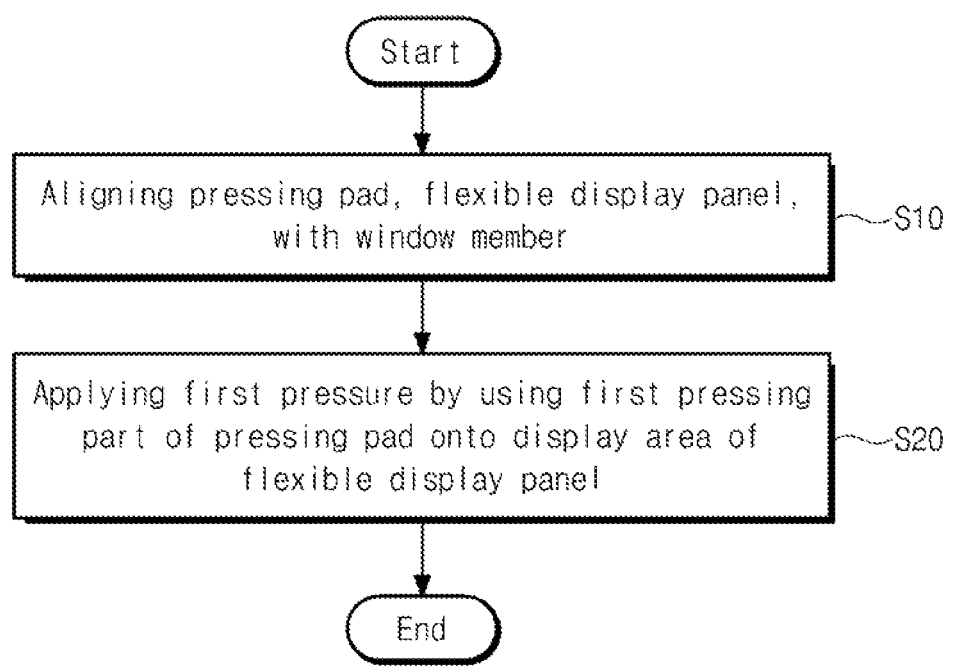
FIG. 4A illustrates a flowchart of a method of assembling the display module according to an embodiment.
Figure 4B:
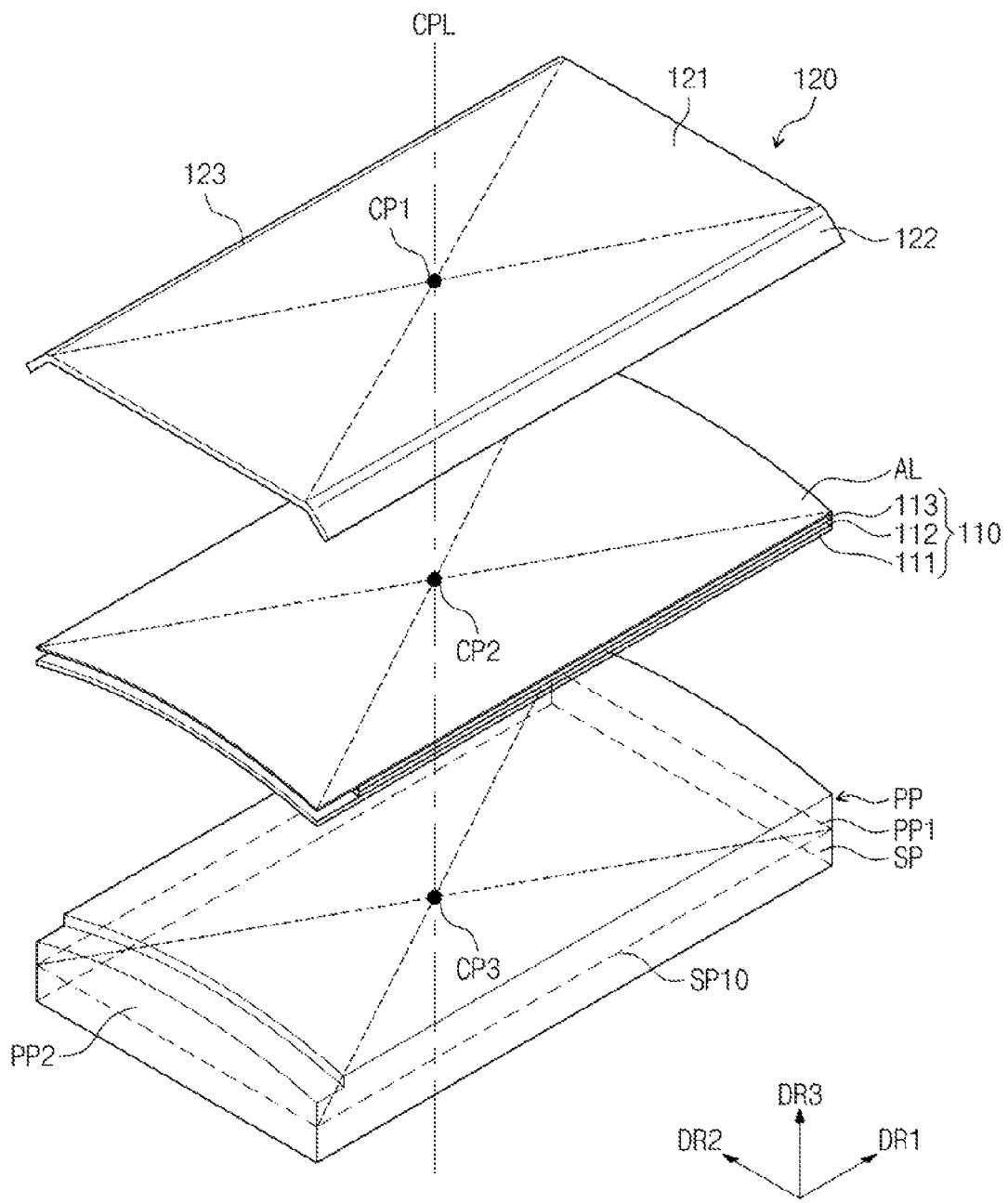
FIG. 4B illustrates a perspective view of an aligning process according to an embodiment.
Figure 4C:
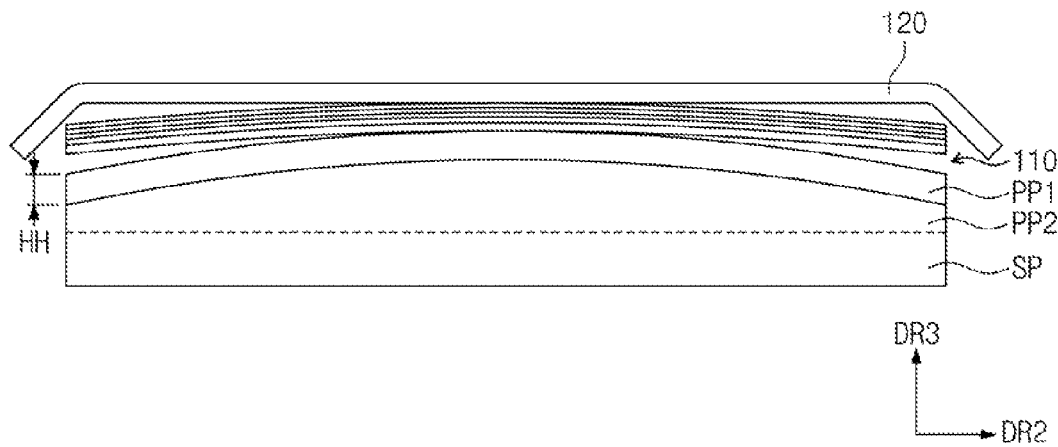
FIGS. 4C and 4D illustrate cross-sectional views of stages in a first pressure applying process according to an embodiment.
Figure 4D:
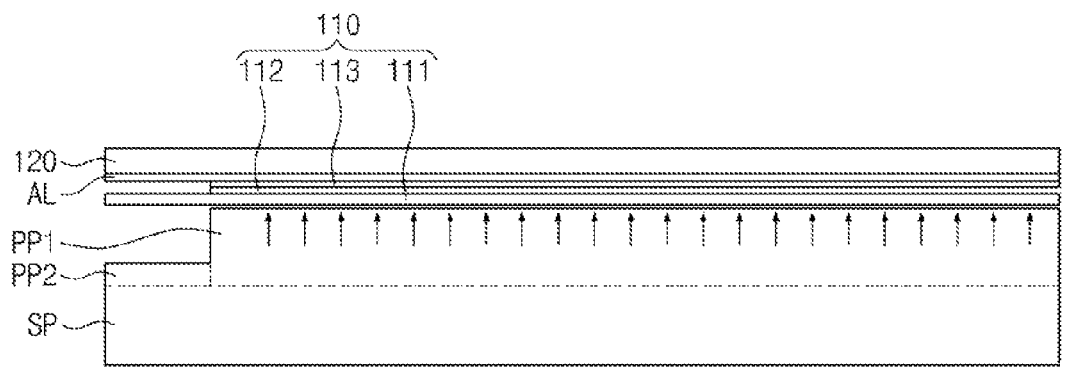

FIG. 4A illustrates a flowchart of a method of assembling a display module 100 according to an embodiment. FIG. 4B illustrates a perspective view of a step or process (S10) in which the pressing pad PP, the flexible display panel 10, and the window member 120 are aligned (e.g., in a line). FIGS. 4C and 4D illustrate cross-sectional views of stages in a process in which the first pressing part PP1 of the pressing pad PP applies the first pressure to the display area AA of the flexible display panel 110. Hereinafter, the method of assembling of the display module 100 will be described with reference to FIGS. 4A to 4D.

As illustrated in FIGS. 4A and 4B, in operation S10, the window member 120, the flexible display panel 110, and the pressing pad PP may be aligned. For example central point CP1 (hereinafter, referred to as a first central point) of the window member 120, a central point CP2 (hereinafter, referred to as a second central point) of the flexible display panel 110, and a third central point CP 3 of the pressing pad PP may be aligned.

The first central point CP1 may be defined on a first portion 121 of the window member 120. The first central point CP1 may be defined as an intersecting point of two diagonal lines connecting vertexes, e.g., opposite vertexes, of the first portion 121 to each other. The second central point CP2 may be defined as an intersecting point of two diagonal lines connecting vertexes, e.g., opposite vertexes, of the flexible display panel 110 to each other. The third central point CP3 may be defined on a support surface SP10 of a support part SP of the pressing part PP. The third central point CP3 may be defined as an intersecting point of two diagonal lines connecting vertexes, e.g., opposite vertexes, of the support surface SP10 to each other.

In an implementation, the first to third central points CP1 to CP3 may be aligned with a reference line CPL (extending in the third direction DR3) to allow the window member 120, the flexible display panel 110, and the pressing pad PP to be aligned.

In an implementation, as illustrated in FIG. 4B, the window member 120, the flexible display panel 110, and the pressing pad PP may be aligned in a state in which the adhesion member AL has already been adhered to the flexible display panel 110. In an implementation, the window member 120, the flexible display panel 110, and the pressing pad PP1 may be aligned in a state in which the adhesion member AL has already been adhered to the window member 120.

As illustrated in FIGS. 4A, 4C, and 4D, in operation S20, the first pressure may be applied to the display area AA of the flexible display panel 110 by the first pressing part PP1 of the pressing pad PP. For example, the pressing pad PP may ascend or move in the third direction DR3 to support or press the flexible display panel 110. As the pressing pad PP moves in the third direction DR3, the flexible display panel 110 may contact the window member 120. As the pressing pad PP further moves in the third direction DR3, the flexible display panel 110 may be attached to the window member 120.

For example, when the pressing pad PP applies a pressure, the main display part MD of the flexible panel 110 may begin to come into linear contact with the window member 120 and may then be attached to the window member 120 while coming into surface-contact with the window member 120 as the pressure applied by the pressing pad PP increases.

In an implementation, the process of applying the first pressure to the flexible display panel 110 may include a process in which the window member 120 moves toward the pressing pad PP and/or a process in which the window member 120 and the pressing pad PP move toward each other.

In an implementation, the pressing part height difference HH may be, e.g., greater than about 1 mm, and a pressure may not applied to the pad area PA of the flexible display panel 110. In an implementation, the pressing pad PP may not apply a pressure to the pad area PA of the display panel 110, and cracks (that may otherwise be generated in the pad area PA while the flexible display panel 110 is attached to the window member 120) may be prevented.

In an implementation, the first pressure may have a maximum value of, e.g., about 0.1 MPa to about 1 MPa. Maintaining the maximum value of the first pressure at about 0.1 MPa or greater may help prevent the generation of gas bubbles in a portion where the each of the window member 120 and the flexible display panel 110 is bent. Maintaining the maximum value of the first pressure at about 1 MPa or less may help ensure that the window member 120 is not broken.

Figure 5A:
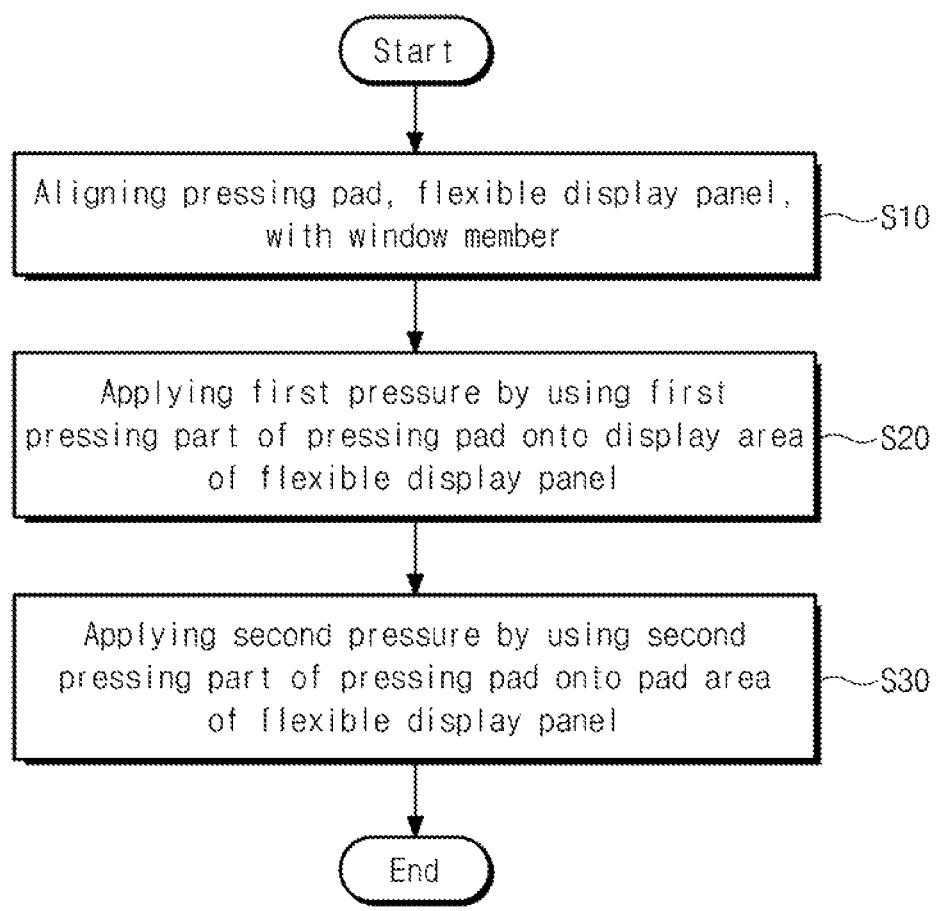
FIG. 5A illustrates a flowchart of a method of assembling the display module according to an embodiment.
Figure 5B:
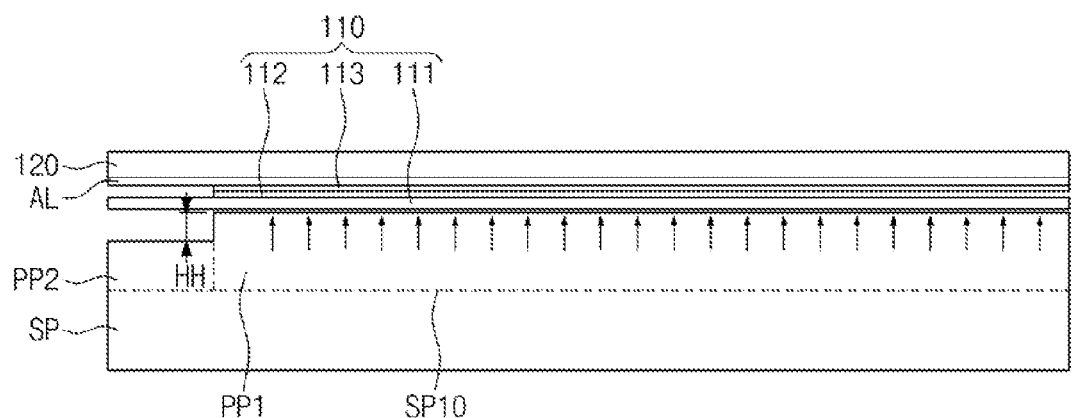
FIG. 5B illustrates a cross-sectional view of stages in a second pressure applying process according to an embodiment.
Figure 5B:
Figure 5B:
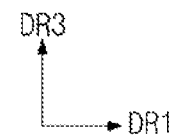
Figure 5B:
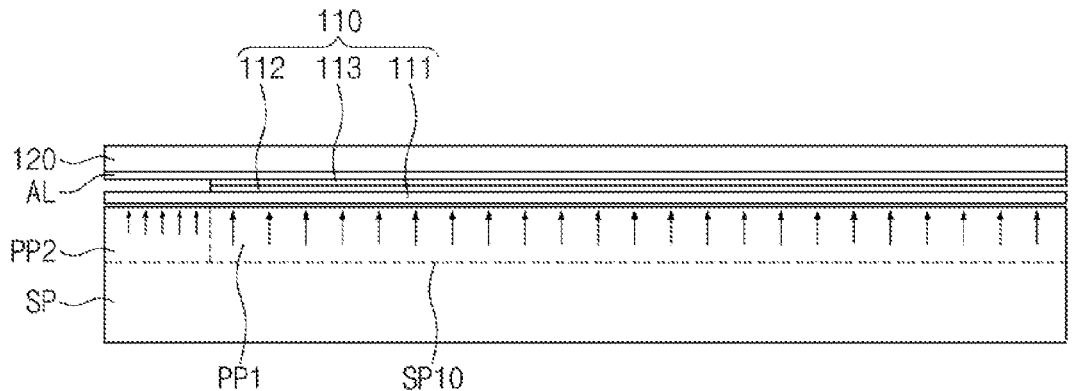
Figure 5B:
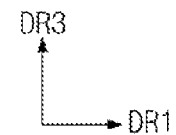

FIG. 5A illustrates a flowchart of a method of assembling the display module 100 according to an embodiment. FIG. 5B illustrates a cross-sectional view of stages in a process in which a second pressing part PP2 of the pressing pad PP applies a second pressure to the pad area PA of the flexible display panel 110. Hereinafter, the method of assembling of the display module 100 will be described with reference to FIGS. 5A to 5B.

A process (S10) in which a window member 120, a flexible display panel 110, and a pressing pad PP are aligned and a process (S20) in which a first pressure is applied to the display area AA of the flexible display panel 110 by using a first pressing part PP1 of the pressing pad PP may be substantially the same as those of FIGS. 4A to 4D, and thus repeated detailed descriptions thereof may be omitted.

As illustrated in FIG. 5B, in order to apply the second pressure to the pad area PA, the first pressure applied to the display area AA may gradually increase to reduce a height of the first pressing part PP1, which is measured from the support surface SP10 in the third direction DR3. Thus, in operation S30, the second pressure may be applied to the pad area PA while the second pressing surface PP20 of the second pressing part PP2 contacts the pad area PA. In order to apply the second pressure to the pad area PA, the pressing part height difference HH may be, e.g., about 50 μm to about 1 mm. Maintaining the pressure height difference HH at about 50 μm or greater may help ensure that there is sufficient difference between the first pressure and the second pressure.

In an implementation, the second pressure (applied to the pad area PA) may be less than the first pressure applied to the display area AA. Thus, cracks generated in the pad area PA while the flexible display panel 110 is attached to the window member 120 may be prevented.

FIGS. 6 to 9C illustrate views of pressing pads PP-1 to PP-4 according to an embodiment. Each of the pressing pads PP-1 to PP-4 illustrated in FIGS. 6 to 9C includes one of first pressing parts PP1-1 to PP1-4 and one of second pressing parts PP2-1 to PP2-4. Each of the first and second pressing parts PP1-1 to PP1-4 and PP2-1 to PP2-4 may have a shape different from that of the pressing pad PP illustrated in FIGS. 3A to 3C. However, the method of assembling the display module 100 using the pressing pads PP-1 to PP4 illustrated in FIGS. 6 to 9C may be the same as those described with reference to FIGS. 4A to 4D and FIGS. 5A to 5B. Hereinafter, the shape of the pressing pads PP-1 to PP-4 according to an embodiment will be described mainly with reference to the shape of each of the first and second pressing parts PP1-1 to PP1-4 and PP2-1 to PP2-4.

Figure 6:
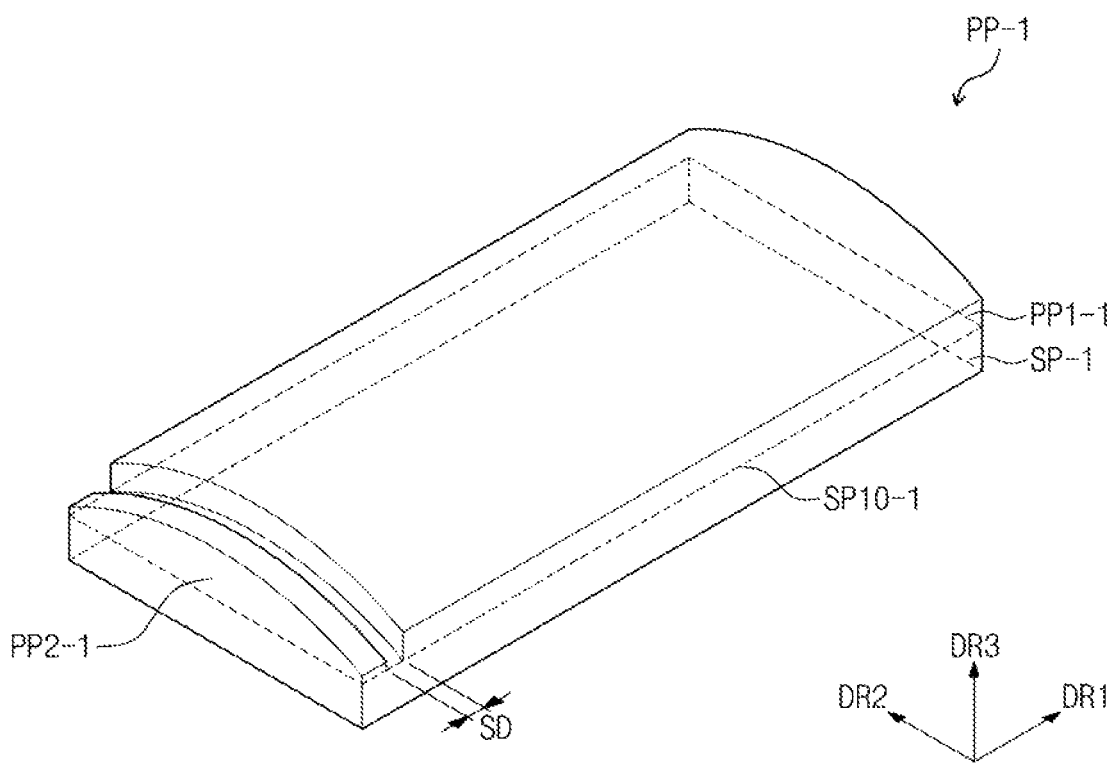
FIG. 6 illustrates a perspective view of a pressing pad according to an embodiment.

FIG. 6 illustrates a view of a pressing pad PP-1 for assembling the display module 100 according to an embodiment.

As illustrated in FIG. 6, the first pressing part PP1-1 may be spaced apart from, e.g., spaced a predetermined distance SD apart from, the second pressing part PP2-1 on the pressing pad PP-1 in a first direction DR1. The distance SD may be defined, and the flexible first pressing part PP1-1 may accurately apply the first pressure to only the display area AA without contacting the pad area PA while the pressing pad PP-1 presses the flexible display panel 110. Also, the flexible second pressing part PP2-1 may accurately apply the second pressure to only the pad area PA without contacting the display area AA. The spaced distance SD may be a suitable distance.

Each of the first and second pressing parts PP1-1 and PP2-1 may have a cross-section with a shape similar to that of FIGS. 3B and 3C.

Figure 7:
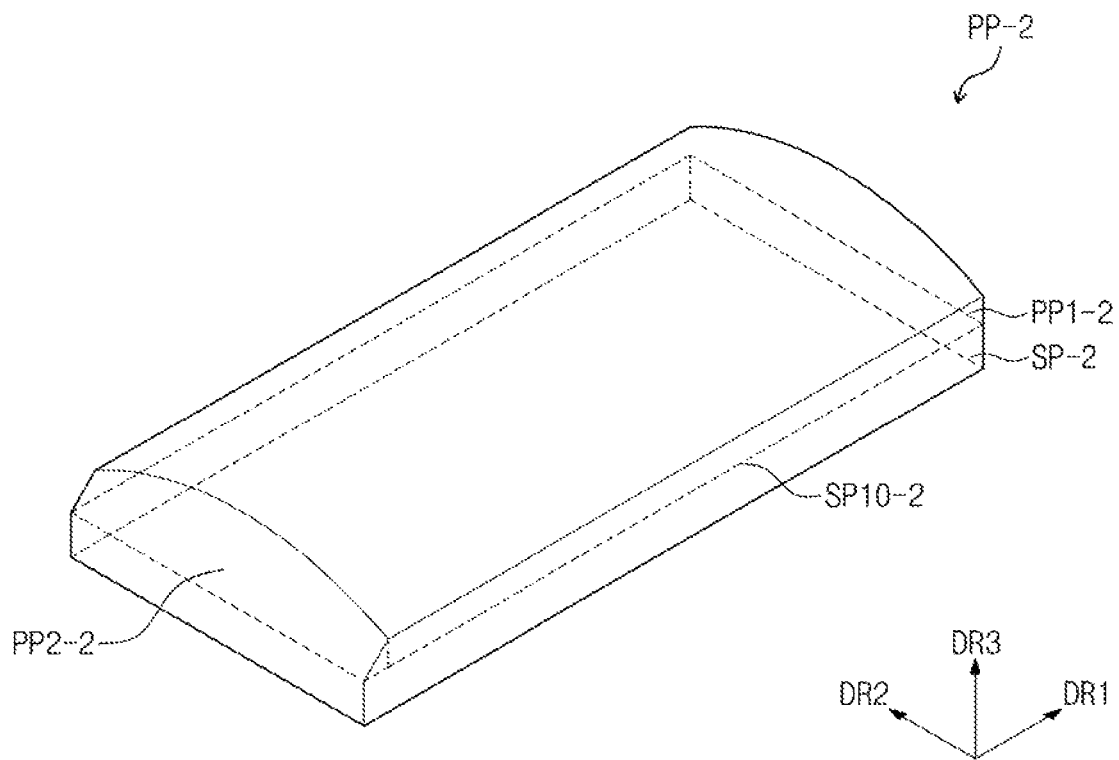
FIG. 7 illustrates a perspective view of a pressing pad according to an embodiment.

FIG. 7 illustrates a view of a pressing pad PP-2 for assembling the display module 100 according to an embodiment.

As illustrated in FIG. 7, a height of the second pressing part PP2-2 (measured from the support surface SP10-2 in the third direction DR3) may gradually decrease in the first direction DR1, e.g., the height (measured in the third direction DR3) of a portion of the second pressing part PP2-2 proximate to the first pressing part PP1-2 may be greater than the height (measured in the third direction DR3) of a portion of the second pressing part PP2-2 distal to the first pressing part PP1-2. A slope of the second pressing part PP2-2 may have, e.g., a linear shape, a parabola shape, or a stepped shape such as a stair.

Figure 8A:
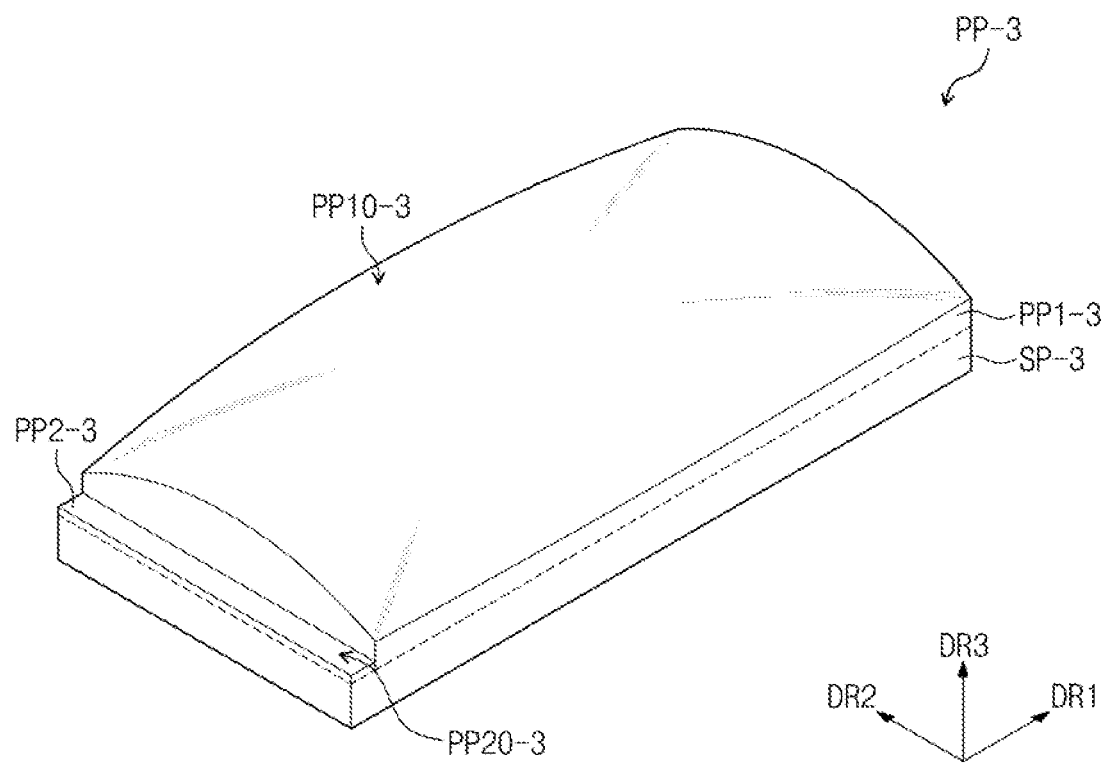
FIGS. 8A to 8C illustrate views of a pressing pad according to an embodiment.
Figure 8B:
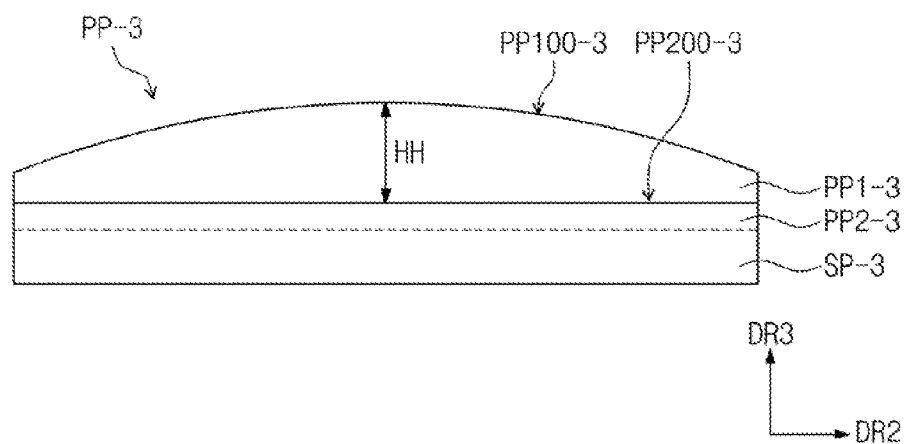
Figure 8C:
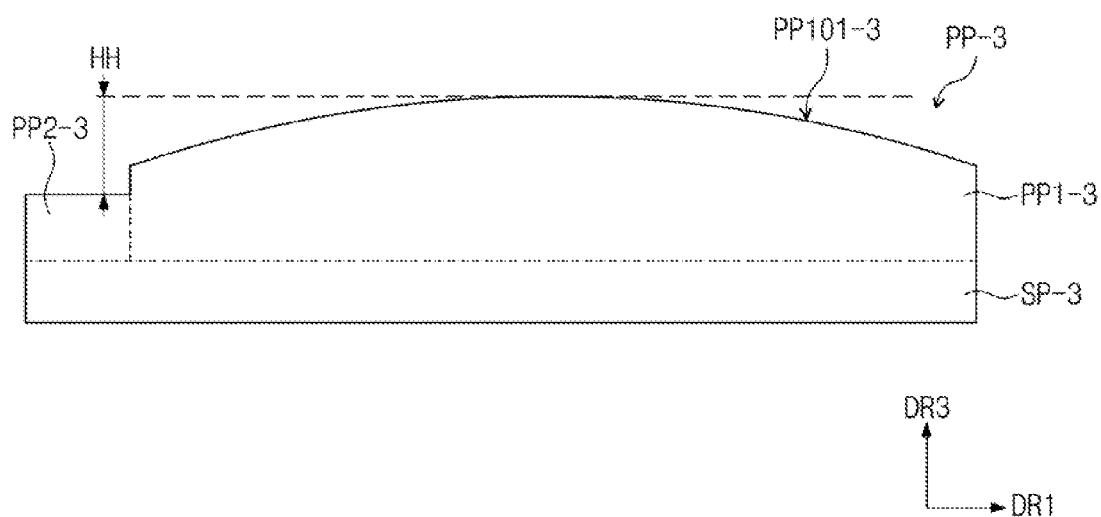

FIGS. 8A to 8C illustrate views of a pressing pad PP-3 for assembling the display module 100 according to an embodiment.

As illustrated in FIG. 8A, a first pressing surface PP10-3 may have a convex spherical shape, and a second pressing surface PP20-3 may have a planar shape. Hereinafter, a shape of each of the first and second pressing parts PP1-3 and PP2-3 will be described with reference to cross-section views of FIGS. 8B and 8C.

As illustrated in FIG. 8B, the first pressing surface PP10-3 may include a first curve PP100-3 in a cross-sectional view of the first pressing surface PP10-3 cut in the second direction DR2 (e.g., in a plane defined by the second direction DR2 and the third direction DR3). The first curve PP100-3 may be on an entirety of or only a portion of the first pressing surface PP10-3. The first curve PP100-3 may have a curvature greater than or equal to that of the bent portion of the flexible display panel 110.

In an implementation, the cross-sectional view of the second pressing part PP2-3 that is cut in the second direction DR2 may have a flat shape in the second direction DR2.

As illustrated in FIG. 8C, the first pressing surface PP10-3 of the first pressing part PP1-3 may have a second curve PP101-3 on the cross-section of the first pressing surface PP10-3 that is cut in the first direction DR1 (e.g., in a plane defined by the first direction DR1 and the third direction DR3). The second curve PP101-3 may be on an entirety of or only on a portion of the first pressing surface PP10-3.

In an implementation, the cross-sectional view of the second pressing part PP2-3 that is cut in the first direction DR1 may have a flat shape in the first direction DR1.

When the first pressing part PP1-3 applies the first pressure to the main display part MD, the main display part MD of the flexible display panel 110 may start to come into point-contact with the first pressing surface PP10-3. As the first pressure applied by the first pressing part PP1-3 increases, the flexible display panel 110 may be attached to the window member 120 while coming into surface-contact with the window member 120. According to the adhesion method in which the pressure due to the point-contact is changed into the pressure due to the surface-contact, a method of assembling the display module 100 may be further precisely conducted.

Figure 9A:
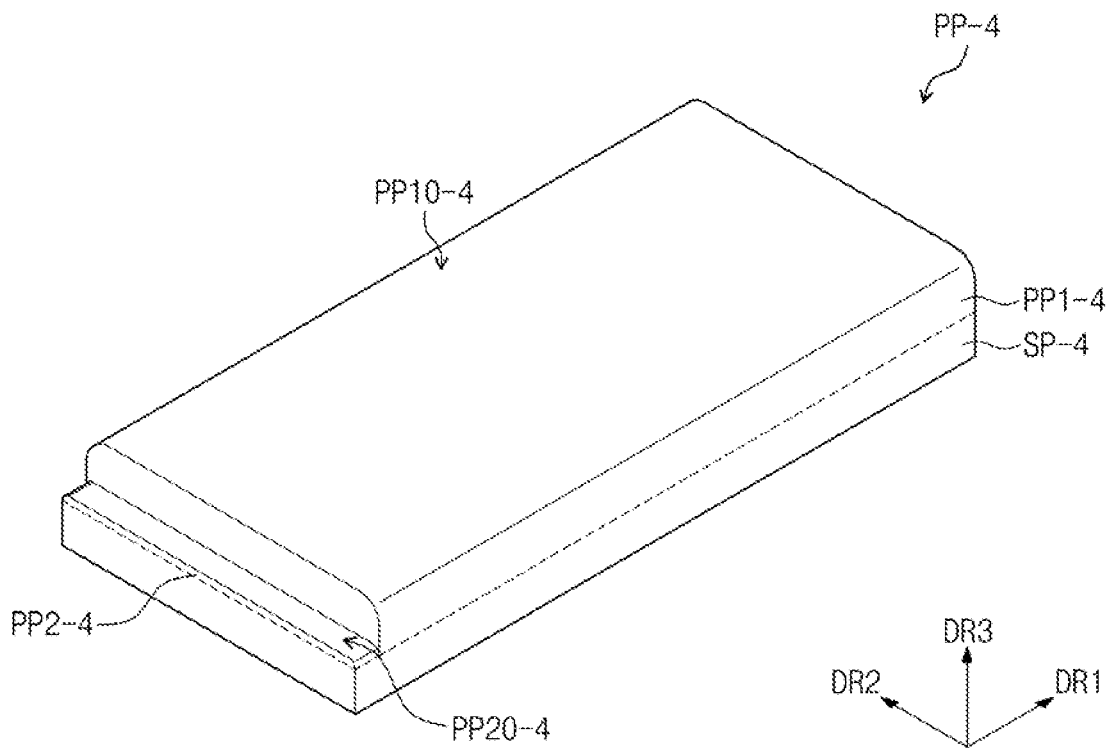
FIGS. 9A to 9C illustrate views of a pressing pad according to an embodiment.
Figure 9B:
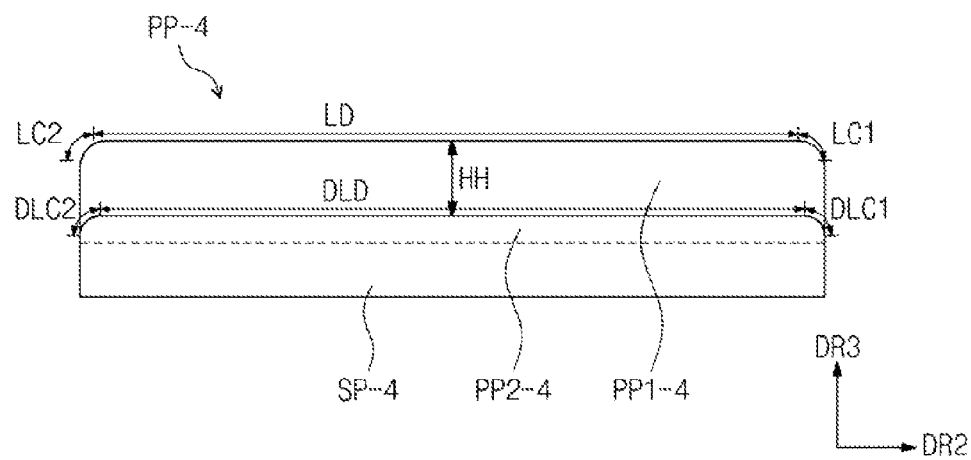
Figure 9C:

FIGS. 9A to 9C illustrate views of a pressing pad PP-4 for assembling the display module 100 according to an embodiment.

As illustrated in FIG. 9A, each of first and second pressing surfaces PP10-4 and PP20-4 may have a flat planar central portion and a curved edge portion. Hereinafter, a shape of each of the first and second pressing parts PP1-3 and PP2-3 will be described with reference to cross-sectional views of FIGS. 9B and 9C.

As illustrated in FIG. 9B, the first pressing surface PP10-4 may have a straight line LD shape corresponding to a first portion 121 of the window member 120 on a cross-sectional view thereof that is cut in the second direction DR2 (e.g., a plane defined by the second direction DR2 and the third direction DR3), a first curve LC1 (corresponding to a second portion 122 of the window member 120), and a second curve LC2 (corresponding to a third portion 123 of the window member 120).

The second pressing surface PP20-4 may have a straight line DLD portion corresponding to the first portion 121 of the window member 120 on the cross-sectional view thereof that is cut in the second direction DR2, a first curve DLC1 (corresponding to the second portion 122 of the window member 120), and a second curve DLC2 (corresponding to the third portion 123 of the window member 120).

As illustrated in FIG. 9C, the first pressing surface PP10-4 may have a straight line substantially parallel to the main display part MD of the flexible display panel 110 in the cross-sectional view of the first pressing surface PP10-4 cut in the first direction DR1.

In an implementation, the second pressing surface PP20-4 may have a straight line that is substantially parallel to the pad area PA of the flexible display panel 110 in the cross-sectional view of the second pressing surface PP20-4 that is cut in the first direction DR1.

In an implementation, the pressing pad PP-4 may have a size that is suitable for being matched the first, second, and third parts 121, 122, and 123 of the window member 120 before the pressing pad PP-4 applies a pressure to the flexible display panel 110. In an implementation, the pressing pad PP-4 may have a size that is suitable for being matched the first, second, and third parts 121, 122, and 123 of the window member 120 after the pressing pad PP-4 applies a pressure to the flexible display panel 110.

According to the above-described embodiments, no pressure may be applied to the pad area, or a pressure applied to the pad area may be less than that applied to the display area. Thus, defects of the display panel due to the cracks in the pad area (due to application of excessive pressure to the pad area) may be prevented.

The embodiments may provide a pressing pad for assembling a display module of which a portion is bent.

The embodiments may provide a pressing pad for assembling a display module and a method of assembling the display module, which are capable of reducing cracks in a pad area, which could otherwise occur while assembling the display module.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A pressing pad for assembling a display module by applying a pressure to a flexible display panel to attach the flexible display panel to a window member, the pressing pad comprising:
    a first pressing part that applies a first pressure onto a display area of the flexible display panel;
    a second pressing part that applies a second pressure onto a pad area of the flexible display panel, the second pressure being less than the first pressure and the pad area of the flexible display panel being adjacent to the display area of the flexible display panel; and
    a support part that supports the first and second pressing parts,
    wherein the second pressing part has a height from the support part that is less than a height of the first pressing part.

2. The pressing pad as claimed in claim 1, wherein the window member includes:
    a first portion having a front surface that is defined by first and second directions that are perpendicular to each other;
    a second portion extending from the first portion in the second direction with respect to a first boundary line that extends in the first direction, the second portion being bent toward the flexible display panel; and
    a third portion extending from the first portion in the second direction with respect to a second boundary line that is parallel to the first boundary line, the third portion being bent toward the flexible display panel.

3. The pressing pad as claimed in claim 2, wherein the flexible display panel includes:
    a main display part attached to the first portion of the window member;
    a first side display part attached to the second portion of the window member; and
    a second side display part attached to the third portion of the window member.

4. The pressing pad as claimed in claim 3, wherein a pressing surface of the first pressing part has a convex curved shape when viewed in cross-section in a plane defined by the second direction and a third direction perpendicular to the second direction.

5. The pressing pad as claimed in claim 4, wherein the pressing surface of the first pressing part has a straight linear shape that is substantially parallel to the main display part of the flexible display panel when viewed in cross-section of the first pressing part in a plane defined by the first direction and the third direction.

6. The pressing pad as claimed in claim 5, wherein the first and second pressing parts are spaced apart from each other in the first direction.

7. The pressing pad as claimed in claim 5, wherein the second pressing part has a height that gradually decreases moving away from the first pressing part in the first direction.

8. The pressing pad as claimed in claim 5, wherein the height of the second pressing part is about 50 µm to about 1 mm less than the height of the first pressing part.

9. The pressing pad as claimed in claim 4, wherein the pressing surface of the first pressing part has a convex curved shape when viewed in cross-section in a plane defined by the first direction and the third direction.

10. The pressing pad as claimed in claim 3, wherein, when viewed in cross-section in a plane defined by the second direction and a third direction perpendicular to the second direction, the pressing surface of the first pressing part has:
    a straight line part corresponding to the first portion of the window member;
    a first curved part corresponding to the second portion of the window member; and
    a second curved part corresponding to the third portion of the window member.

11. The pressing pad as claimed in claim 10, wherein the pressing surface of the first pressing part has a straight line shape that is substantially parallel to the main display part of the flexible display panel when viewed in cross-section in a plane defined by the first direction and the third direction.

12. The pressing pad as claimed in claim 1, wherein each of the first and second pressing parts includes silicon.

13. The pressing pad as claimed in claim 1, wherein the flexible display panel includes a display panel part, a touch panel part, and a polarization part.

* * * * *